(12) United States Patent
Worobey et al.

(10) Patent No.: US 8,074,770 B2
(45) Date of Patent: Dec. 13, 2011

(54) PORTABLE HUNTING TREE STAND

(76) Inventors: Peter J. Worobey, Toronto (CA);
Michael S. Smith, Toronto (CA)

( * ) Notice: Subject to any disclaimer, the term of this patent is extended or adjusted under 35 U.S.C. 154(b) by 436 days.

(21) Appl. No.: 12/266,978

(22) Filed: Nov. 7, 2008

(65) Prior Publication Data

US 2010/0116593 A1 May 13, 2010

(51) Int. Cl.
*E04G 3/24* (2006.01)
(52) U.S. Cl. .................................. 182/187; 248/218.4
(58) Field of Classification Search ............ 182/187, 182/188, 92; 108/152, 134, 135; 248/219.4, 248/218.4
See application file for complete search history.

(56) References Cited

U.S. PATENT DOCUMENTS

| | | | | |
|---|---|---|---|---|
| 2,370,607 A * | 2/1945 | Schuh | ............................ | 108/152 |
| 2,394,203 A * | 2/1946 | Pruder | ........................... | 108/135 |
| 4,641,727 A * | 2/1987 | McKelvy | ........................ | 182/46 |
| 5,083,324 A * | 1/1992 | Strong | .............................. | 4/460 |
| 6,343,834 B1 * | 2/2002 | Wurmlinger | ..................... | 297/14 |
| 6,471,461 B2 * | 10/2002 | Muilwyk | ....................... | 414/276 |
| 7,036,632 B1 * | 5/2006 | Price | .............................. | 182/187 |
| 7,174,995 B1 | 2/2007 | Alexander | | |
| RE39,725 E * | 7/2007 | Muhich | .......................... | 182/187 |
| 7,377,361 B1 | 5/2008 | Tschida | | |

* cited by examiner

*Primary Examiner* — Katherine Mitchell
*Assistant Examiner* — Daniel Cahn
(74) *Attorney, Agent, or Firm* — Sand & Sebolt

(57) ABSTRACT

A portable tree stand comprising a seat having a bottom surface, the bottom surface having a first sidewall and a second sidewall at least partially defining a cavity, a mount extending from the cavity for engagement with a tree, and wherein the mount is contained completely within the cavity when not in use.

19 Claims, 12 Drawing Sheets

PORTABLE HUNTING TREE STAND

BACKGROUND OF THE INVENTION

1. Technical Field

The invention relates generally to hunting tree stands. More particularly, the invention relates to portable tree stands that a hunter can easily carry into the woods and quickly setup. Specifically, the invention relates to an ultra-light portable tree stand with a retractable support mechanism which is storable hidden from view within the tree stand body when not in use.

2. Background Information

Hunters have been using tree stands for several decades with a great deal of success. The use of a tree stand allows the hunter to avoid detection since s/he is above the sight and scent line of the animal and will not be stepping on debris such as leaves that may startle the animal. Further, the tree stand allows the hunter greater visibility due to the increased height and the ability to shoot over limbs and brush. In particular, bow hunters prefer tree stands because they generally need to be much closer to the animal than a hunter with a firearm and the features previously mentioned tend to allow the hunter a much closer shot.

Tree stands generally come in four varieties; tower stands, climbing stands, ladder stands, and hang on stands. The tower stand is not technically a tree stand because it is not attached to tree. However, in areas where there are no trees or trees which are not suitable to mount a tree stand, the tower stand is a promising alternative. The tower stand includes a plurality of legs which meet at the top to support a seat. This gives the hunter the ariel view advantages without having to climb a tree. Nevertheless, the extreme weight and size of the stand prevents any chance of portability.

Climbing stands generally include a pair of platforms that allow the hunter to maneuver up a tree to the desired height. The upper platform is moved up while standing on the lower platform. The hunter then puts weight on the upper platform, brings the lower platform upward, and then steps back down on the lower platform. This procedure continues until the hunter reaches the desired height. While the climbing stand is light and allows the hunter to hunt from a variety of trees, the intense physical requirements for climbing and potential for falling are severe.

The ladder stand is basically a ladder with a seat at the top. The entire assembly is then secured to the tree such that the hunter can climb the ladder to get into and out of the tree stand. While it is much easier to climb the ladder than the tree, the ladder stand is very heavy and not portable.

Hang on stands include a seat and a footrest that is attached to the tree. This type of tree stand is relatively lightweight and allows reasonable portability. However, the hunter is required to the climb the tree by installing climbing steps, using a climbing stick, or climbing up limbs.

SUMMARY OF THE INVENTION

The present invention broadly comprises a portable tree stand including a seat having a bottom surface, the bottom surface having a first sidewall and a second sidewall at least partially defining a cavity, a mount extending from the cavity for engagement with a tree, and wherein the mount is contained completely within the cavity when not in use. The tree stand may also include a sound absorption material.

The tree stand mount may further include a first leg, a second leg, and a support, the support having a first end and a second end wherein the first end is pivotally mounted proximate the second sidewall and the second end engages with the mount. The support second end may further include a plurality of slots for receiving the mount.

BRIEF DESCRIPTION OF THE DRAWINGS

The preferred embodiment of the invention, illustrative of the best mode in which Applicants have contemplated applying the principles of the invention, are set forth in the following description and are shown in the drawings.

DESCRIPTION OF THE PREFERRED EMBODIMENTS

At the outset, it should be appreciated that like drawing numbers on different drawing views identify identical, or functionally similar, structural elements of the invention. While the present invention is described with respect to what is presently considered to be the preferred embodiment, it is to be understood that the invention as claimed is not limited to the disclosed aspects.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

The tree stand of the present invention is indicated generally at 14, as is particularly shown in FIGS. 1 through 12. As particularly shown in FIG. 1, a preferred embodiment tree stand 14 is shown secured to a tree 16 with a strap 18 and a mount assembly 20.

Figure 2:
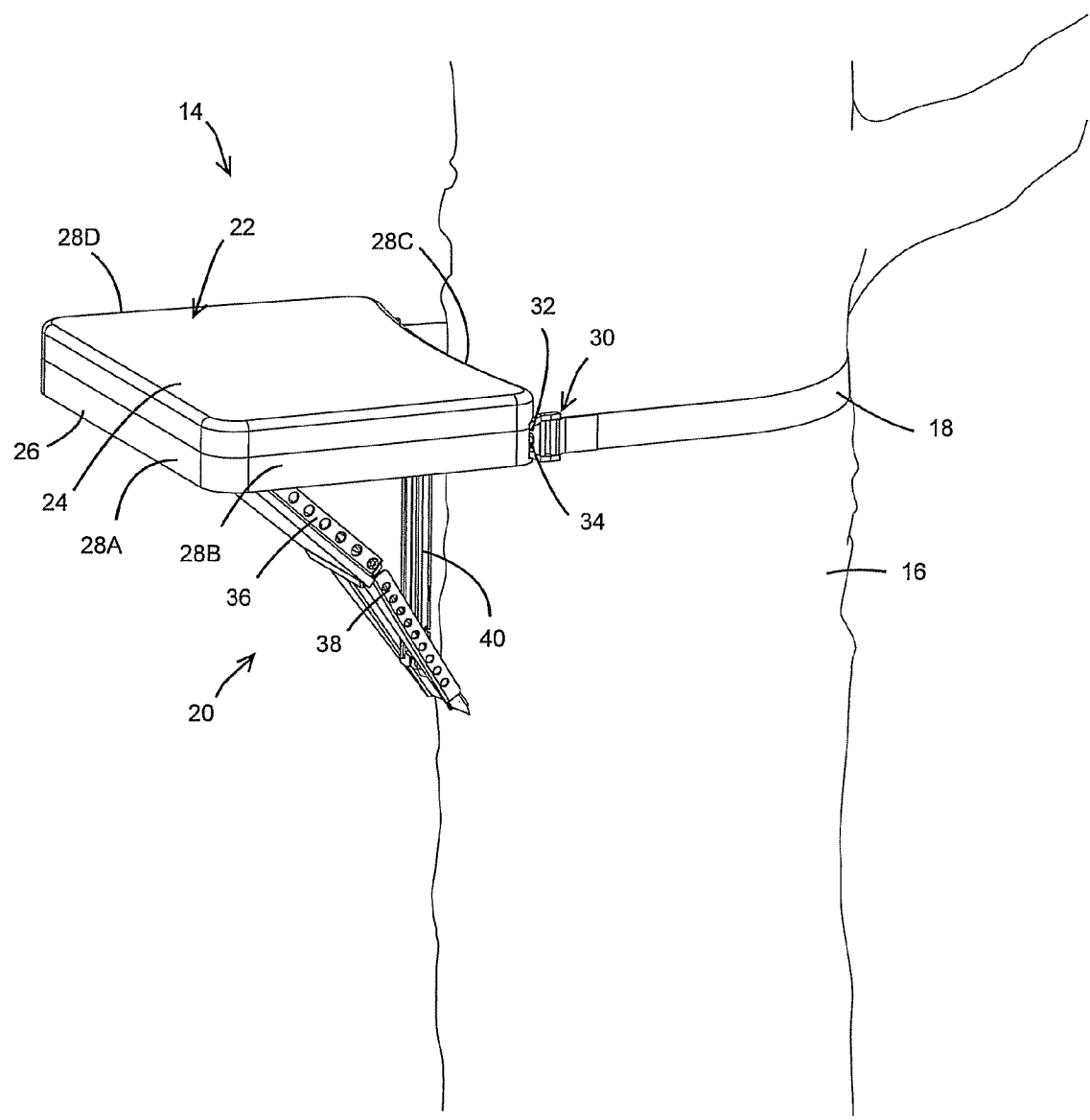
FIG. 2 is a perspective view of a preferred embodiment tree stand attached to a tree.
Figure 3:
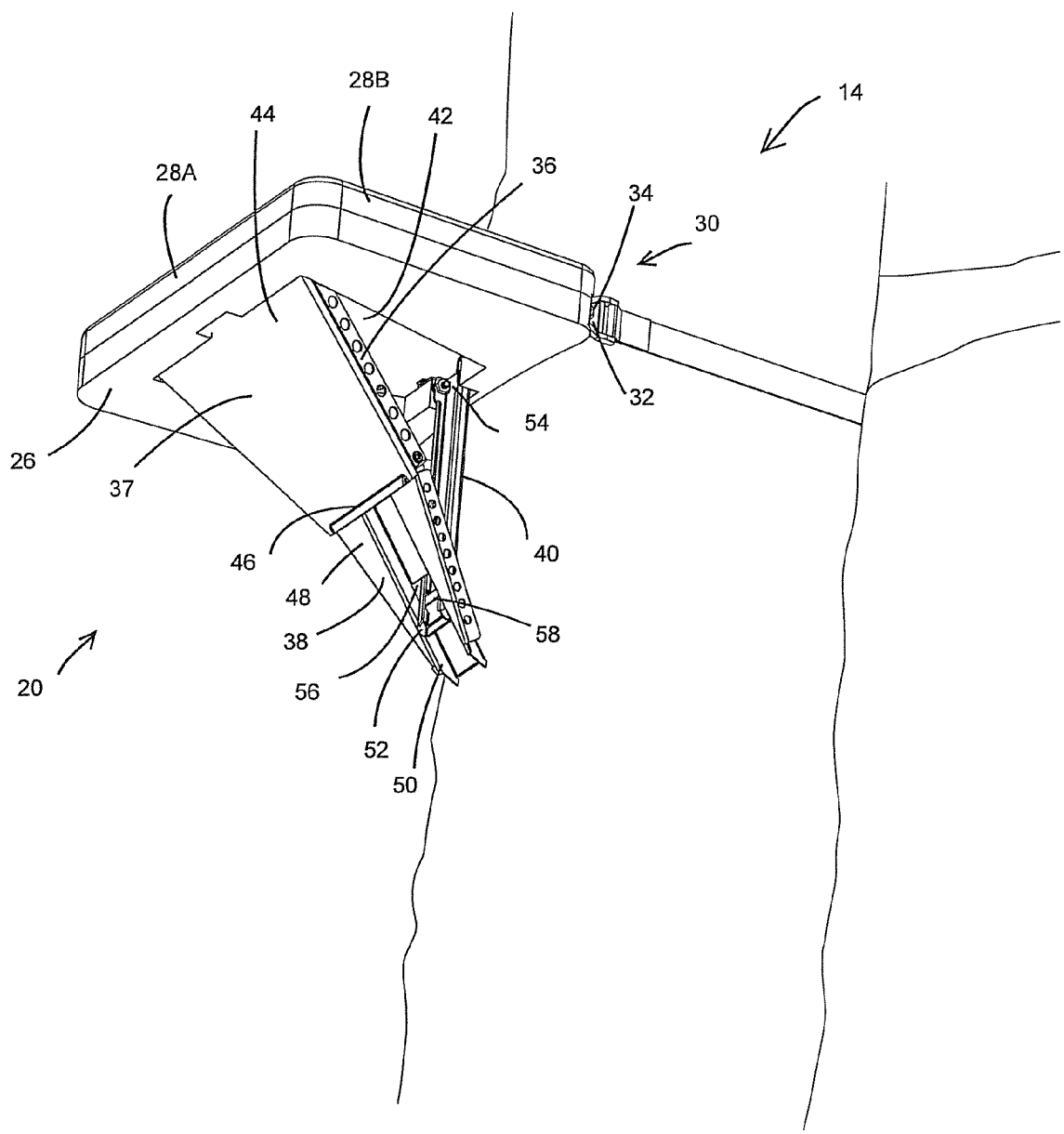
FIG. 3 is a lower perspective view of a preferred embodiment tree stand attached to a tree.
Figure 4:
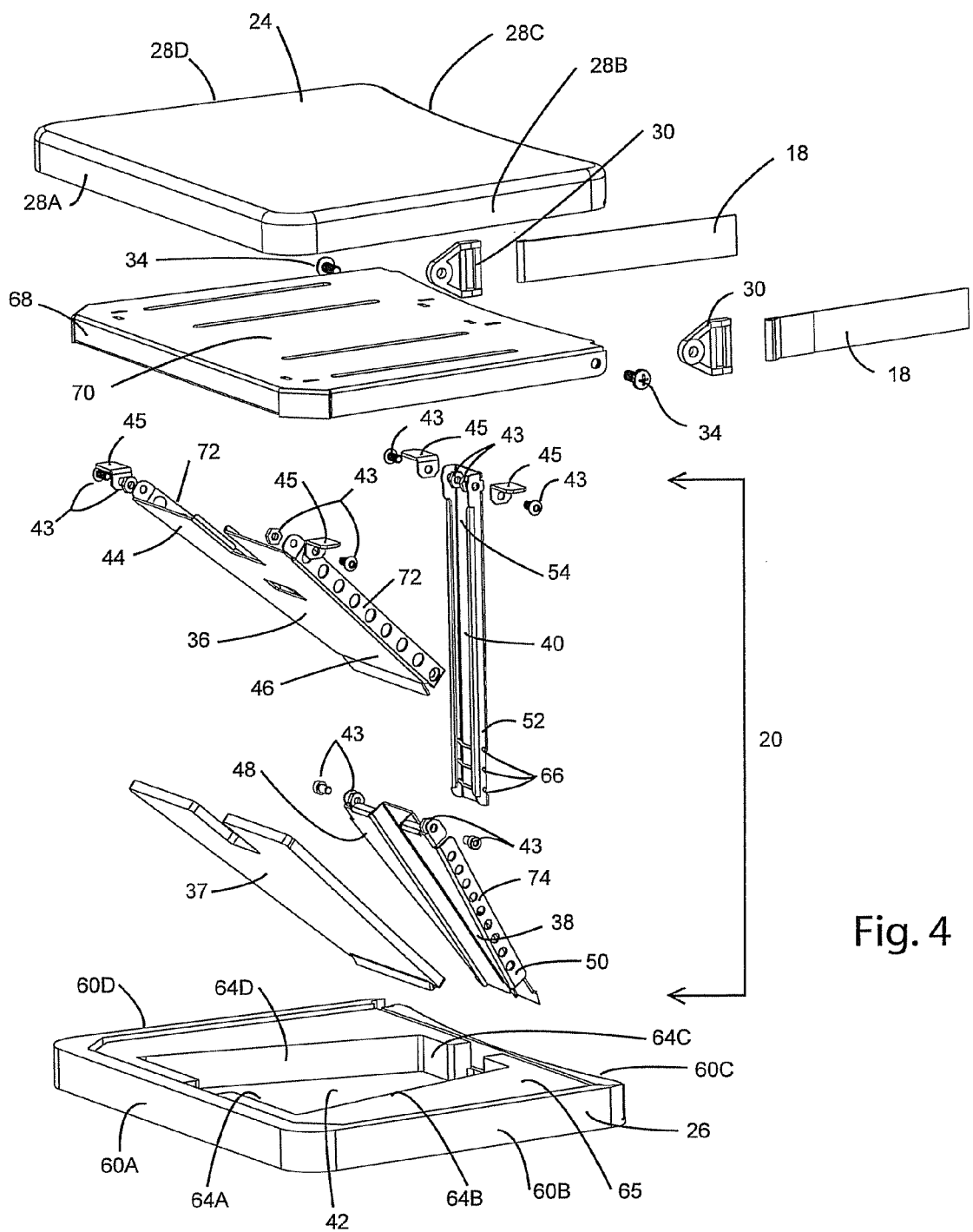
FIG. 4 is an exploded perspective view of a preferred embodiment tree stand.

Averting to FIGS. 2, 3, and 4, tree stand 14 includes a seat 22 which is generally rectangular in shape and sized to comfortably allow a hunter to sit fully within the boundaries of the seat. Seat 22 includes an upper member 24, a lower member 26, and side walls 28A-28D. Extending generally from sides 28B and 28D is strap 18. Strap 18 includes a pair of buckles 30 which each have a pair of slots and bars to allow strap 18 to pass-through. Advantageously, strap 18 can be adjusted by pulling the free end after it has been zigzagged through the pair of slots and bars. Further, buckles 30 each include a mounting hole 32 arranged to be secured to sides 28B and 28D with a screw 34.

In accordance with one of the main features of the present invention, mount assembly 20 preferably comprises three main components, first leg 36 with outer cover 37, second leg 38, and support 40. First leg 36 is pivotally connected to a front side of a cavity 42 with nuts and bolts 43 and brackets 45. In particular, a first end 44 of the first leg is pivotally connected to the front side, while a second end 46, distal the first end, is pivotally connected to a first end 48 of second leg 38 with nuts and bolts 43. Further, a second end 50 of the second leg is releaseably secured to a second end 52 of support 40. A first end 54 is pivotally secured to a back side of cavity 42 with nuts and bolts 43 and brackets 45. As seen in FIG. 3, second end 52 of support 40 partially passes through a cavity 56 in second leg 38 and is releaseably connected at tab 58. Cavity 42 is formed by side walls in the lower member as described below in detail. Each of the pivotal connections described above is preferably a nut and bolt connection such that the components are axially secured but can still freely pivot with respect to each other. Nevertheless, the pivot connections may be rivets, screws, or any other suitable connector known in the art.

First leg 36 and second leg 38 are preferably arranged to gradually and continuously decrease in width from the first end 44 of first leg 36 to second end 50 of second leg 38. Advantageously, the decrease in width allows the mount assembly to maintain a great deal of strength and rigidity while terminating at a second end 50 which can be easily located against a tree.

Focusing on FIG. 4, which is an exploded perspective view of the present invention. Lower member 26 includes outer walls 60A-60D arranged to be adjacent and internal to side walls 28A-28D of the upper member. A cavity 42 is defined by inner walls 64A-64D. Similar to first leg 36 and second leg 38, cavity 42 is generally tapered from inner wall 64A to inner wall 64D to match the shape of first leg 36. The lower member also includes a recessed portion 65 on the top that is sized and shaped to tightly secure a seat pan 68. Upper member 24, lower member 26, and cover 37 are preferably composed of foam or other resilient material which is comfortable to sit on, lightweight, absorbs vibration and noise, and reduces metal-to-metal contact.

As noted above, support 40 is releaseably secured within cavity 62 of second leg 38. Support 40 also includes a plurality of slots 66 arranged perpendicular to the length of the support. Advantageously, slots 66 allow the user to control the tilt angle of the seat by selecting which of the slots to engage with tab 58 of the second leg.

Intermediate upper member 24 and lower member 26 is seat pan 68. The seat pan is generally square or rectangular in shape with a slightly concave upper surface 70. The upper surface is slightly concave so that the hunter is centered on the seat pan as well as more comfortable. Further, the seat pan is of a size and shape to fit completely within upper member 24 and lower member 26 when fully assembled. The seat pan is preferably composed of injection molded plastic for stability and support.

Figure 5:
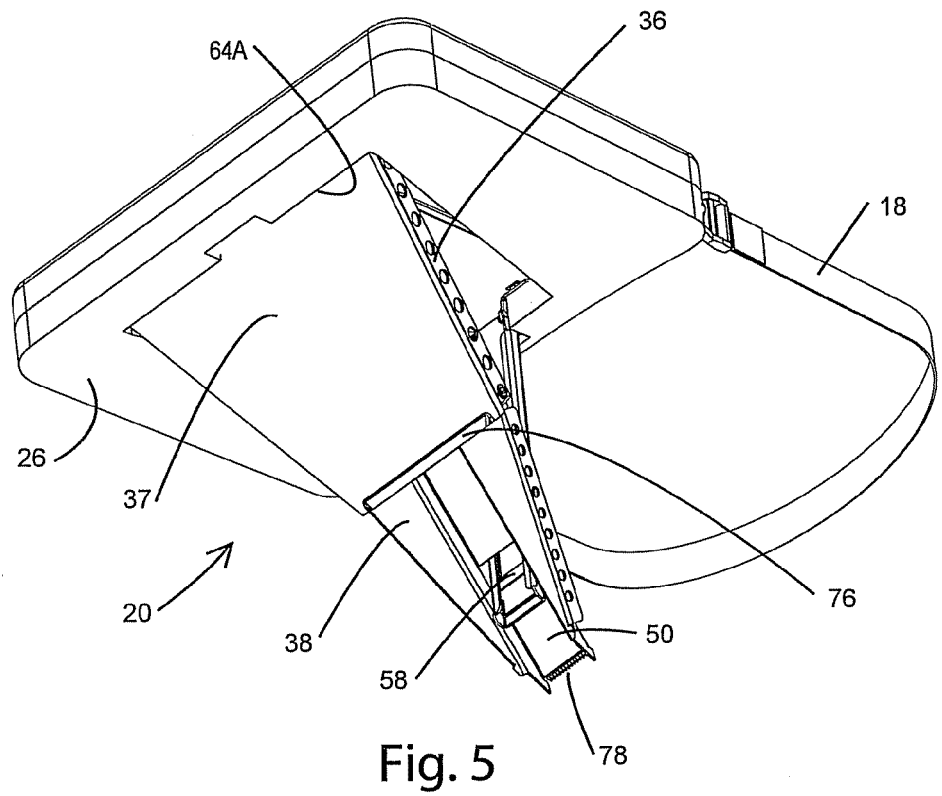
FIG. 5 is a lower perspective view of a preferred embodiment tree stand with the mount assembly fully extended.
Figure 6:
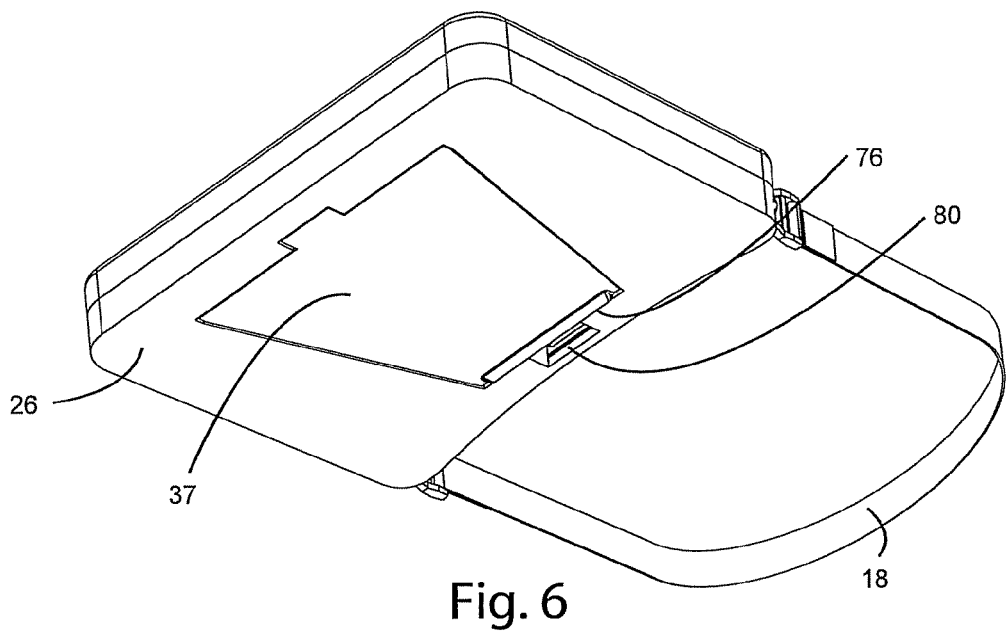
FIG. 6 is a lower perspective view of a perspective view tree stand with the mount assembly within the body in the stored position.

Averting to FIG. 5, where mount assembly 20 is shown fully extended, and FIG. 6, where mount assembly 20 is shown fully retracted. First leg 36 and cover 37 include a handle 76 which allows the hunter to easily lower the first leg from within the cavity in order to fully extend the mount assembly.

In accordance with another main feature of the present invention, second end 50 of second leg 38 includes a plurality of teeth 78. Teeth 78 are arranged with sharp leading edges to engage and dig into a tree to provide support and stability to the tree stand. The teeth are preferably disposed at an angle with respect to the second leg 38. Specifically, since first leg 36 and second leg 38 extend at an angle from inner wall 64A, teeth 78 are disposed at a slight angle from the angle that the first and second leg extend from the inner wall. In other words, the teeth are disposed at an angle from parallel to lower member 26 to provide vertical support for the tree stand.

FIG. 6 specifically shows the tree stand in the carrying position with mount assembly 20 fully enclosed within cavity 42. In this arrangement, strap 18 can be located on the hunter's shoulder to allow easy movement. Further, handle 76 of mount assembly 20 is easily accessible through an opening 80 in lower member 26. Thus, when the tree stand is in the carrying position, the tree stand is very quite since only foam of upper member 24, lower member 26, and cover 37 are exposed.

Figure 7:
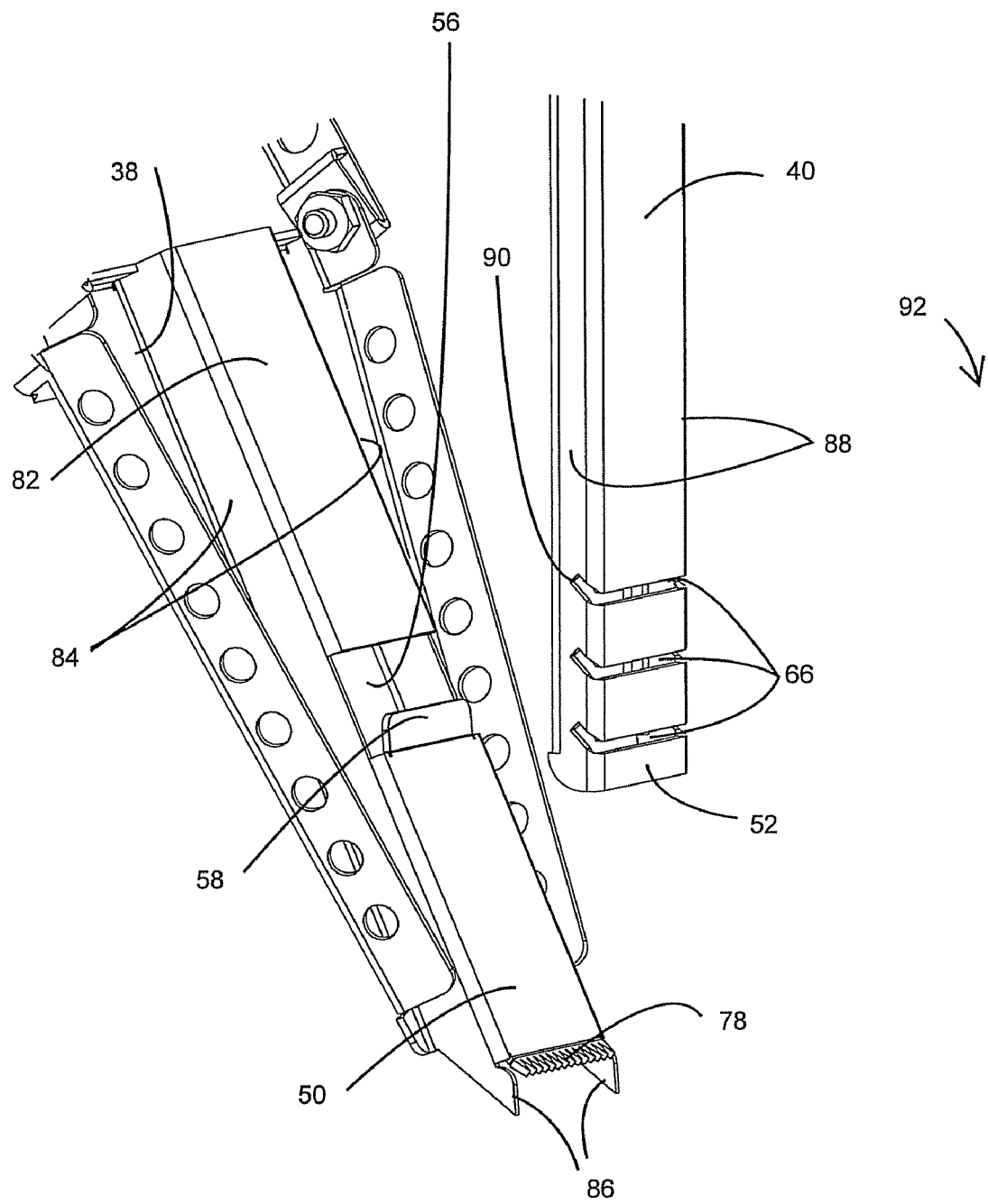
FIG. 7 is an enlarged view of the support slots and the mount teeth.
Figure 8:
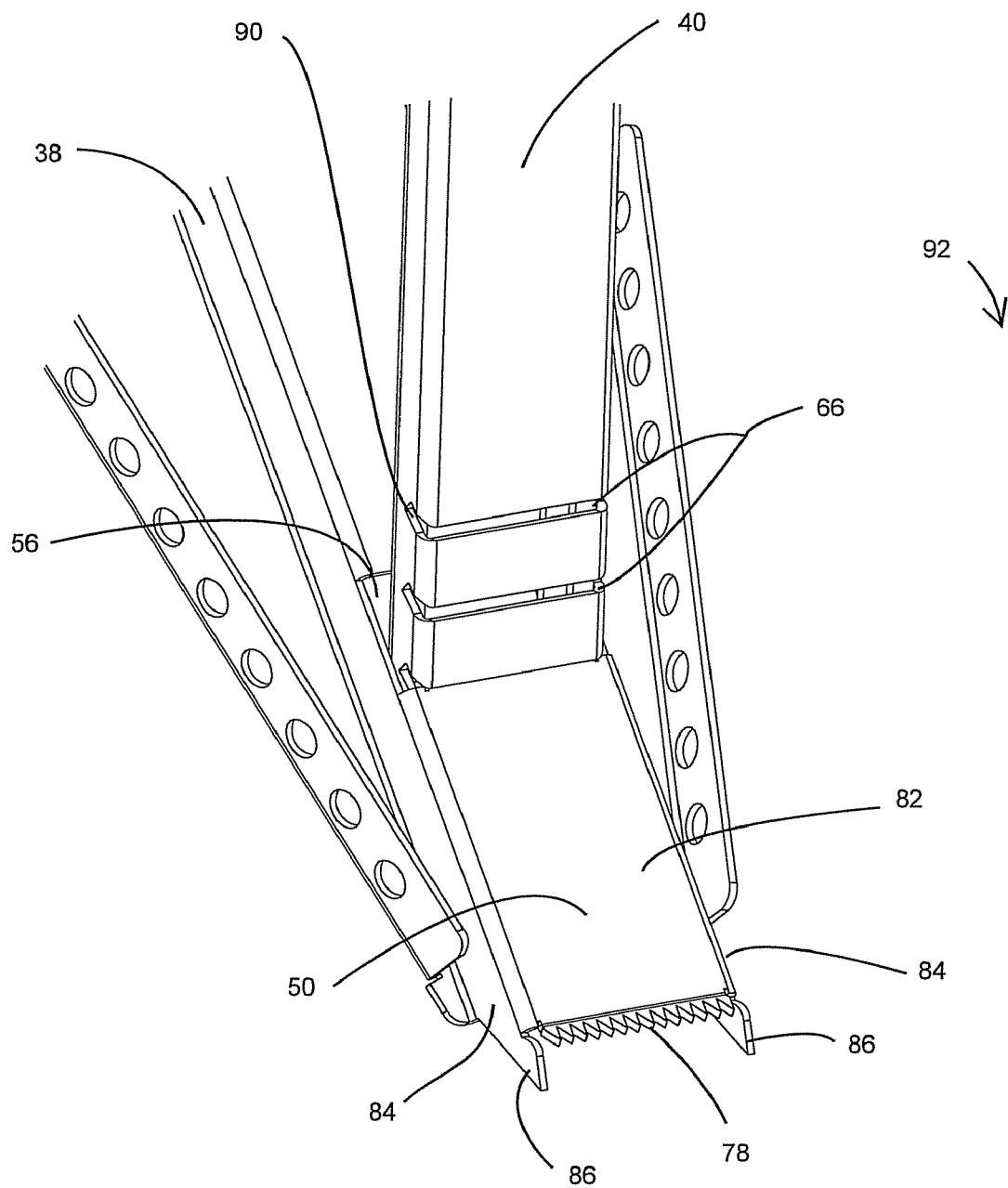
FIG. 8 is an enlarged view of the support slots engaged with the mount.

In accordance with yet another main feature of the present invention, FIGS. 7 and 8 illustrate the connection between second leg 38 and support 40. Second leg 38 includes a central step 82 that runs the length of the leg and terminates in teeth 78. Central step 82 extends from the second leg body with walls 84. Central step 82 has a width of approximately the same size as cavity 56, both of which are slightly larger than the width of support 40. Second leg 38 also includes a pair of supports 86 extending from side walls 84 and adjacent teeth 78. Supports 86 help to provide stability and reduce rotational movement at teeth 78 due to their larger size and placement at the outside edges of second end 50.

Support 40 is shown with three slots 66. Each of the slots is arranged parallel to one another and generally straight across the width of the support. Further, each slot extends at least partially through support side walls 88. More specifically, slots 66 extend into the side walls in a slightly angled side slot 90. The angled side slot is preferably angled similar to tab 58. Accordingly, the angled slots allow the tab 58 to travel further within the slot for better engagement between second leg 38 and support 40.

Releaseable engagement between the mount legs and the support is achieved by locating tab 58 within one of slots 66. Since support 40 is sized to fit within cavity 56 and tab 58 is sized to slide within slots 66, the hunter connects the second leg and the support by locating second end 52 of the support within the cavity and pivots the support in the direction associated with arrow 92, such that one of slots 66 fully encompasses tab 58. As previously noted, a plurality of slots are located on the support and provide the ability to selectively adjust the seat tilt since the front portion of the seat will travel a further distance for engagement with a lower slot and will travel a shorter distance for engagement with a higher slot. Thus, selecting a slot closer towards second end 52 will result in front seat wall 28A being lowered. To remove the support from tab 58, the hunter simply pivots the support in a direction opposite arrow 92.

Figure 9:
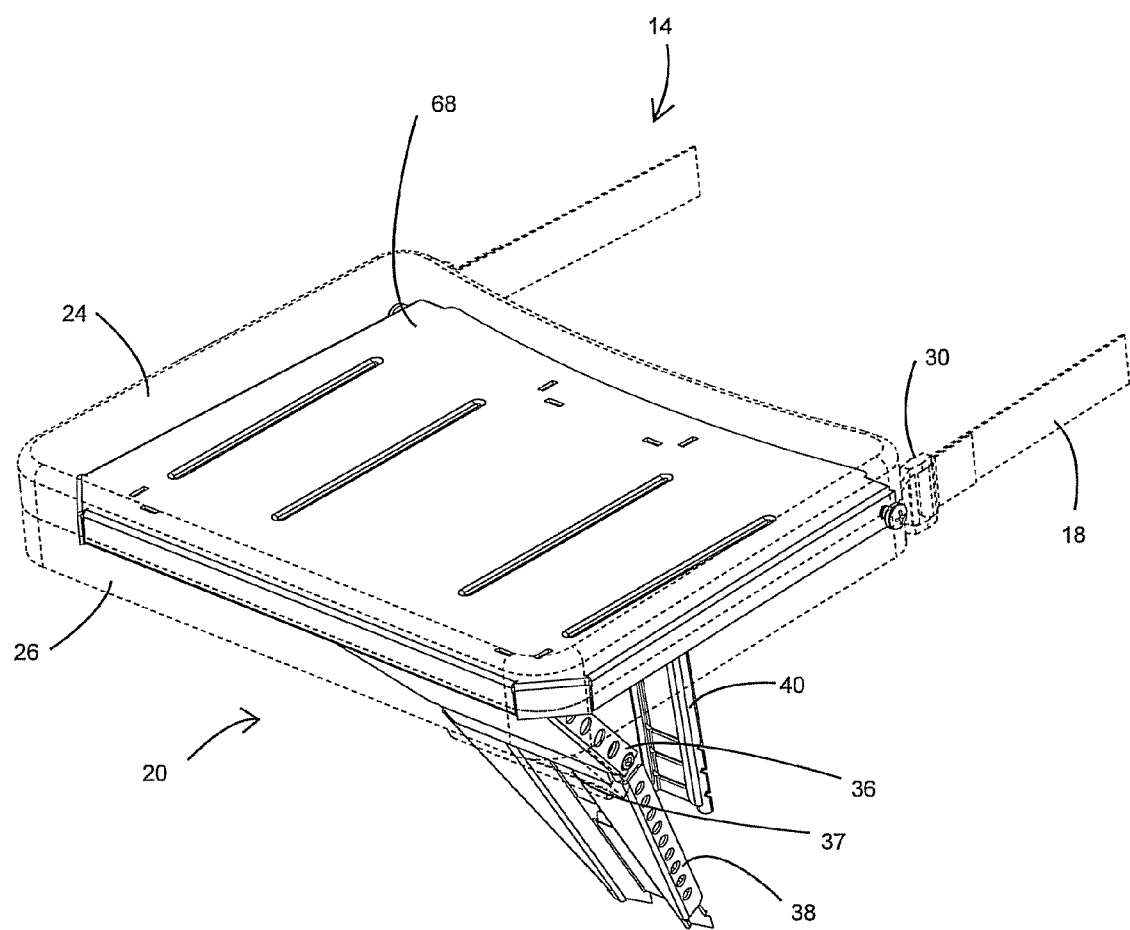
FIG. 9 is a perspective view of a preferred embodiment tree stand with the seat and strap shown in dashed lines.

FIG. 9 is a perspective view of tree stand 14 with the foam pieces, upper member 24, lower member 26, and cover 37, shown in dashed lines to illustrate the arrangement of seat pan 68 and mount assembly 20. Further, buckles 30 and strap 18 are also shown in dashed lines. Accordingly, the tree stand forms a generally triangular shape consisting of first leg 36, second leg 38, support 40, and seat pan 68. In addition, when the tree stand is attached to a tree, tree 16 also forms a portion of the generally triangular shape.

Figure 1:
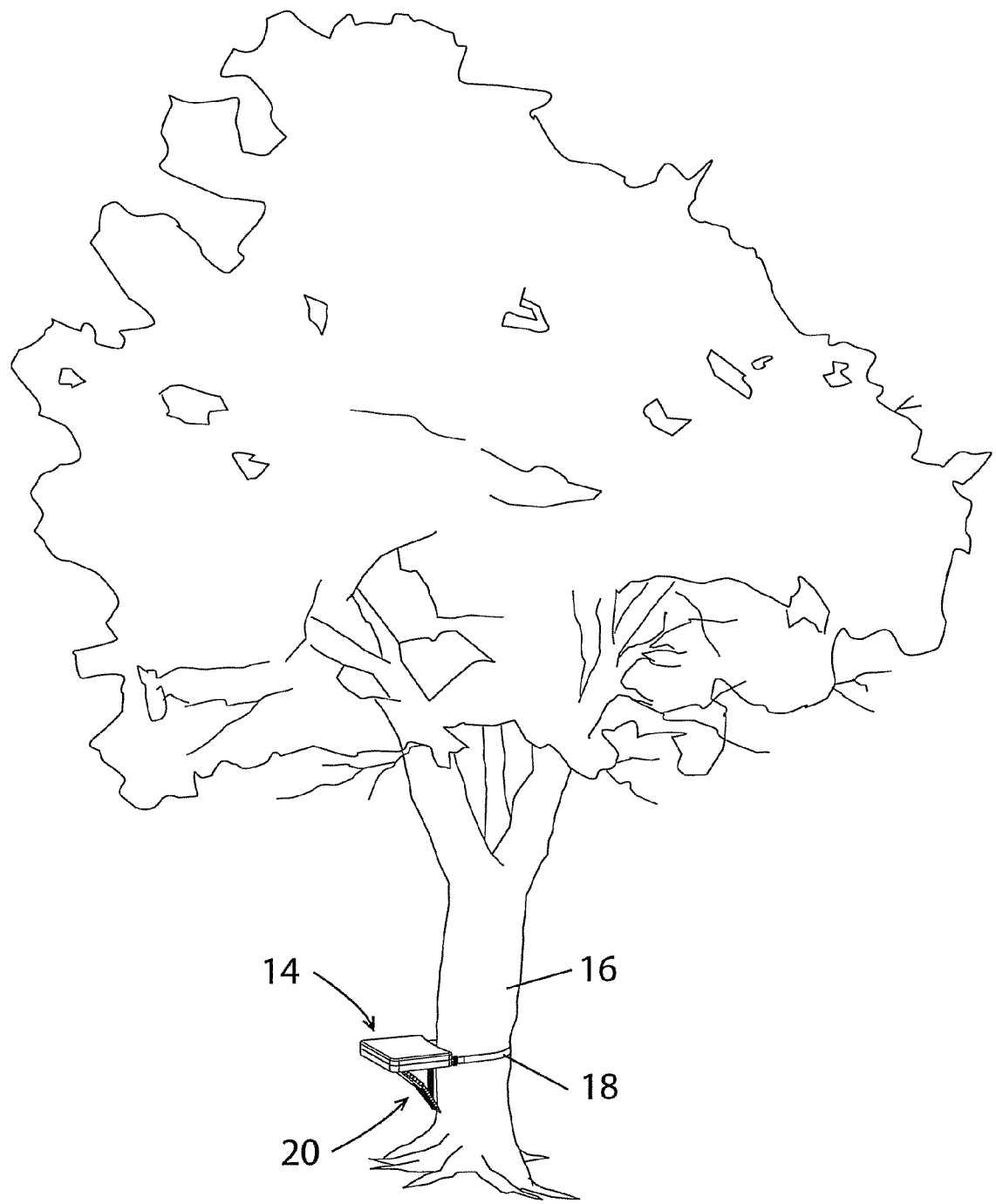
FIG. 1 is a perspective view of a preferred embodiment tree stand attached to a tree.

Having described the structure of the preferred embodiment, a preferred method of operation will be described in detail and should be read in light of FIGS. 1 though 17 and particularly FIGS. 10 through 17.

Figure 10:
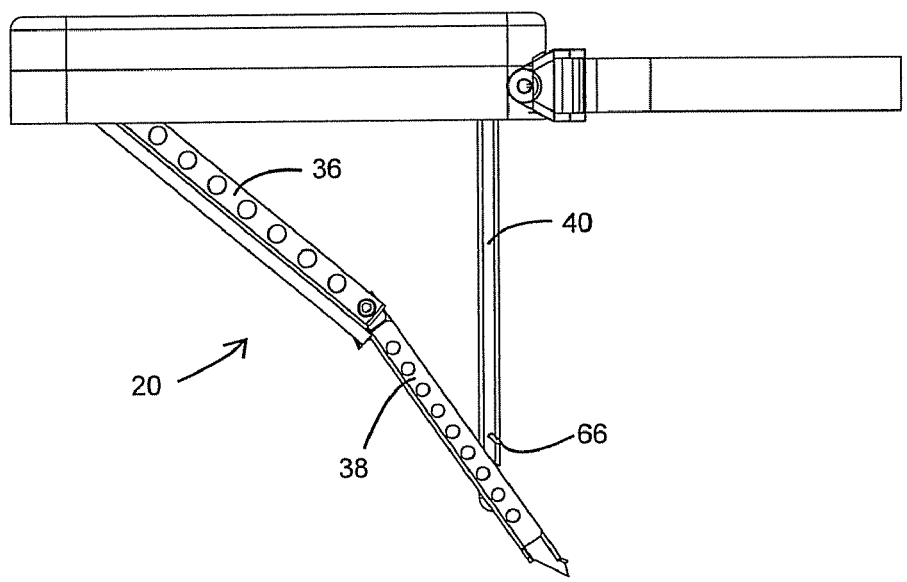
FIG. 10 is a side view of a preferred embodiment tree stand with the mount assembly fully extended.
Figure 11:
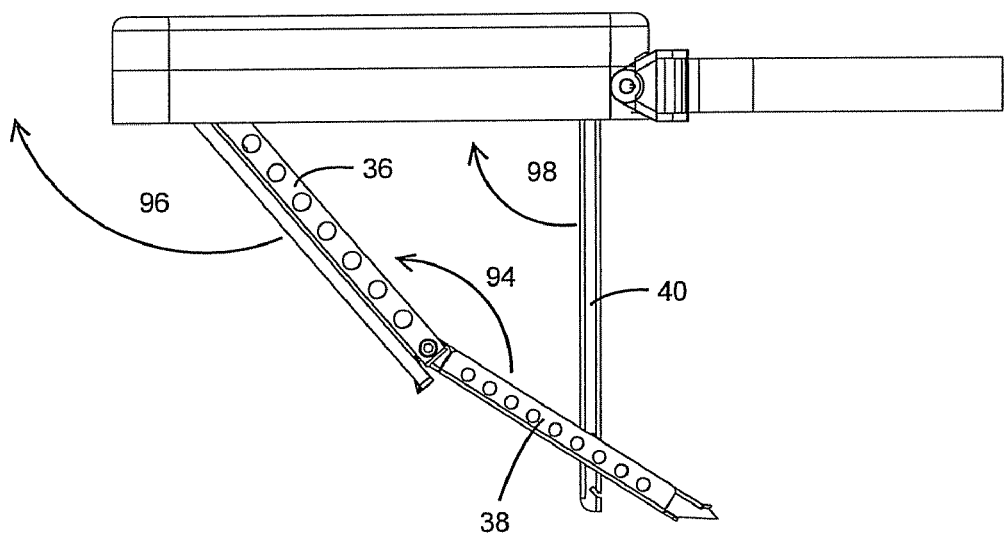
FIG. 11 is a is a side view of a preferred embodiment tree stand with arrows indicating the pivot directions of the mount assembly.
Figure 12:
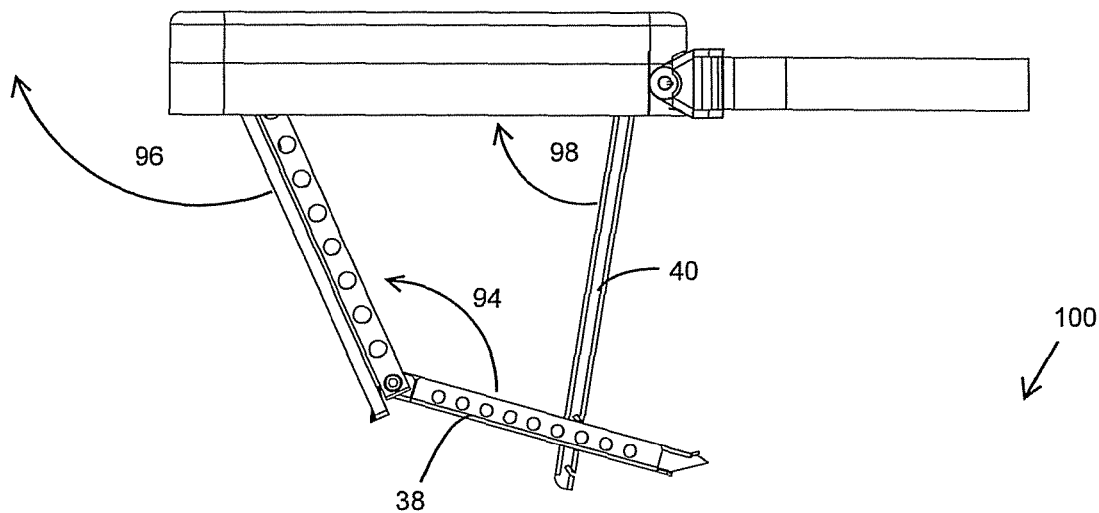
FIG. 12 is a side view of a preferred embodiment tree stand with the support being disconnected from the mount second leg.
Figure 13:
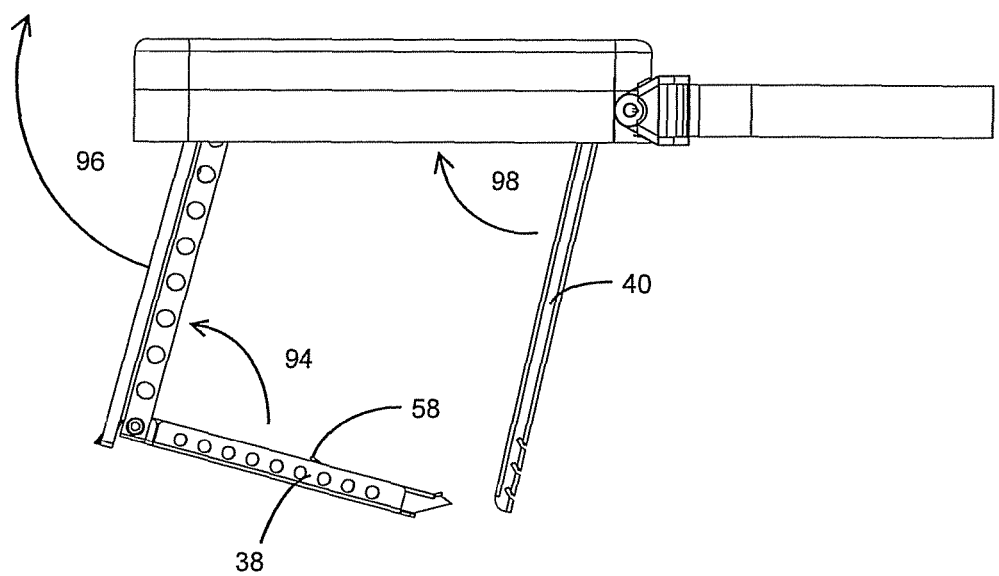
FIG. 13 is a side view of a preferred embodiment tree stand with the support disconnected from the mount first and second legs and the mount legs being pivoted away from the support.
Figure 14:
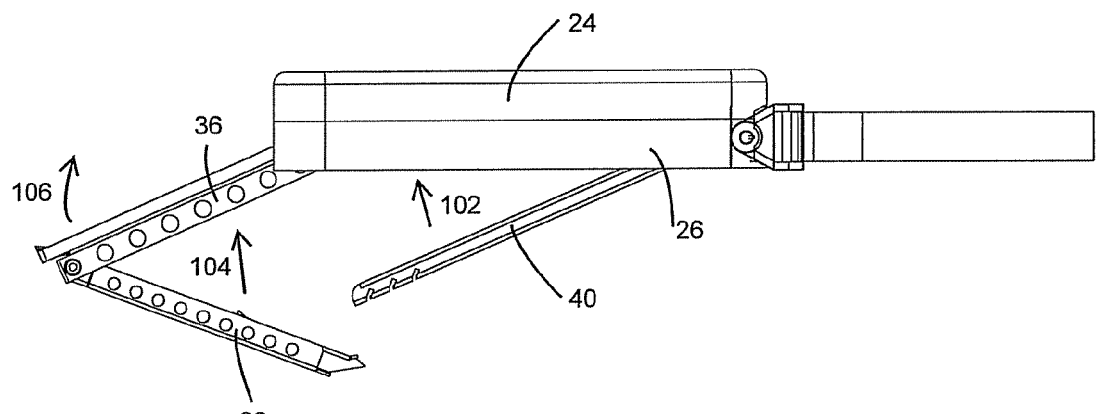
FIG. 14 is a side view of a preferred embodiment tree stand with the support pivoted into the body.

FIG. 10 is a side view of tree stand 14, shown with mount assembly 20 fully extended and support 40 secured to second leg 38. As initially seen in FIGS. 11-16, mount assembly 20 is folded and pivoted at multiple locations. First, second leg 38 is rotated in the direction associated with arrow 94 to release slot 66 and tab 58 (not shown) while first leg 36 is rotated in the direction associated with arrow 96. Next, support 40 is rotated in the direction associated with arrow 98 until slot 66 and tab 58 are completely disconnected and support 40 is located within cavity 56. Second leg 38 is then lowered in the direction associated with arrow 100 so that support 40 is no longer disposed in cavity 56, as seen in FIG. 13.

Once support 40 and second leg 38 are disconnected and pivoted so that they do not interfere with each other, support 40 is rotated in the direction associated with arrow 102 (FIG. 14) until the support is fully contained within lower member 26. Second leg 38 is rotated in the direction associated with arrow 104, while first leg 36 is rotated in the direction of arrow 106. In particular, first leg 36 is rotated in the direction of arrow 106 to provide additional clearance, which may be done before support 40 is rotated into lower member 26. However, support 40 must be fully seated within the lower member before the first and second legs can be located within the lower member.

Figure 15:
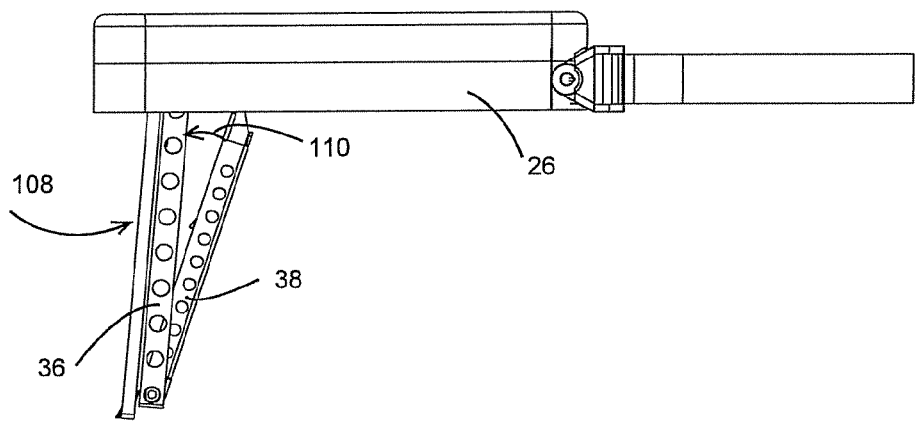
FIG. 15 is a side view of a preferred embodiment tree stand with the mount second leg being folded within the mount first leg.

Next, first leg 36 is rotated in the direction associated with arrow 108, while second leg 38 is rotated in the direction associated with arrow 110, as seen in FIG. 15. Advantageously, second leg 38 is being rotated back towards first leg 36 so that the second leg is parallel and adjacent the first leg to reduce the space the mount assembly requires in the carrying position.

Figure 16:
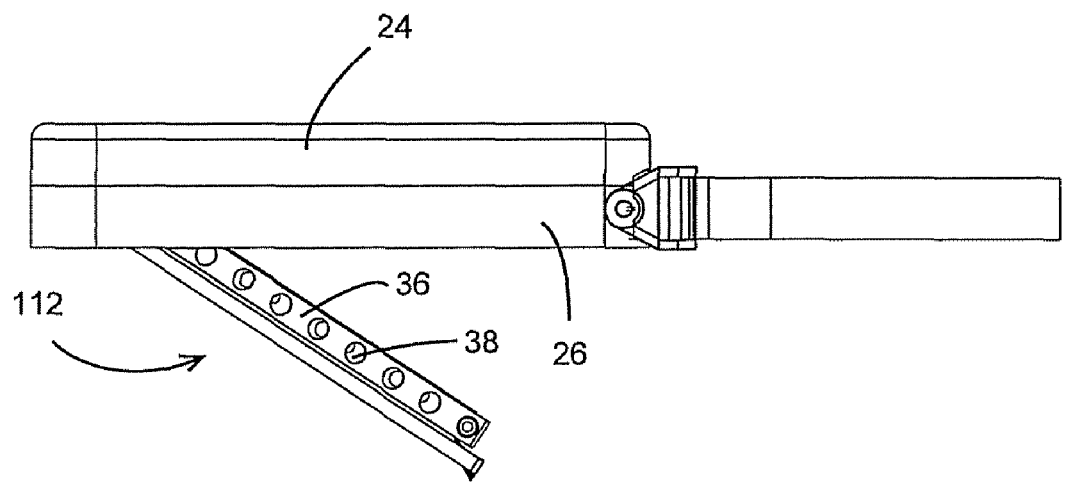
FIG. 16 is a side view of a preferred embodiment tree stand with the mount legs being pivoted into the body; and, FIG. 17 is a side view of a preferred embodiment tree stand with the mount legs and support located within the body.
Figure 17:
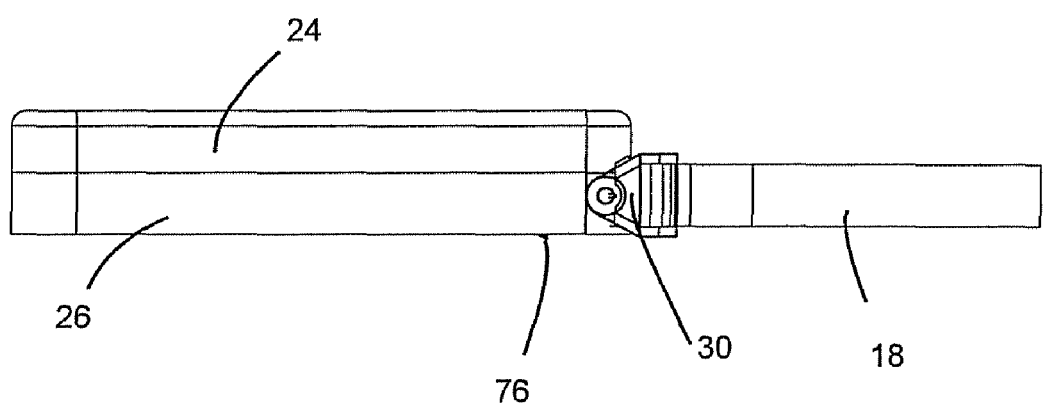

Averting to FIG. 16, second leg 38 is seen rotated adjacent and parallel first leg 36. Finally, first leg 36 is rotated in the direction associated with arrow 112 until the first and second legs are seated within the lower member. Thus, the first leg, second leg, and support are all positioned within the lower member as seen in FIG. 17. The mount assembly may be contained within the lower portion by frictional resistance throughout the pivot joints. Although the first leg, second leg, and support will easily pivot upon rotation by the hunter, a slight amount of frictional resistance is desired so that the mount assembly remains within the lower member during transit.

Extending the mount assembly for connection to a tree requires the same procedure detailed above, but performed in reverse. Thus, the tree stand can be easily moved from one place to another since the mount assembly is hidden and the hunter is left with a generally rectangular seat cushion.

Accordingly, the portable tree stand is an effective, safe, inexpensive, and efficient device that achieves all the enumerated objectives of the invention, provides for eliminating difficulties encountered with prior art devices, systems, and methods, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the portable tree stand is constructed and used, the characteristics of the construction, and the advantageous new and useful results obtained; the new and useful structures, devices, elements, arrangement, parts, and combinations are set forth in the appended claims.

What is claimed is:

1. A portable tree stand comprising:
   a seat having a rear wall, a left side wall, a right side wall and a bottom surface extending therebetween;
   a strap extending outwardly from the seat, said strap being pivotally secured to the left and right side walls thereof, said strap being adapted to secure the rear wall of the seat adjacent a tree trunk;
   a cavity defined
   by the bottom surface of the seat, said cavity being bounded and defined by an interior front wall, an interior back wall, an interior first sidewall and an interior second sidewall of the bottom surface;
   a mount engaged with the bottom surface of the seat and adapted to engage a portion of the tree trunk, said mount being movable between a use position and a non-use position, where the use position is when the mount supports the seat for use by a person and the non-use position is when the mount is retained within the cavity, the mount further comprises a first member pivotally secured at a first end of the first member between the interior first and second sidewalls and spaced a distance inwardly from a front wall of the seat;
   a support pivotally secured at a first end of the support between the interior first and second sidewalls and spaced a distance inwardly from the rear wall of the seat and a distance from the first end of the first member, a second end of the support is adjustably engageable with a second end of the first member in order to change an angle of the seat relative to the tree trunk, and the mount is adjustable to retain the seat at any one of a plurality of angles relative to the bottom surface when in the use position, and the mount can still support the person on the seat when positioned in any one of said plurality of angles;
   a cover engageable with the mount and complementary in shape to the cavity so that when said mount is in the non-use position and is disposed within the cavity, the cover substantially covers the cavity.

2. The tree stand of claim 1, wherein the first member of the mount further comprises:
   a first leg having a first end and a second end;
   a first hinge pivotally securing the first end of the first leg to the interior first and second sidewalls of the bottom surface of the seat and proximate the interior front wall thereof;

the support further has a second end; and a second hinge pivotally securing the first end of the support to the interior first and second sidewalls of the bottom surface of the seat and proximate the interior rear wall thereof.

3. The tree stand of claim 2, wherein the first leg and the support are releasably secured to one another.

4. The tree stand of claim 2, wherein the first member further comprises a second leg having a first end and a second end, and a pivot secures the first end of the second leg and the second end of the first leg together; and wherein the second end of the second leg adjustably engages the second end of the support.

5. The tree stand of claim 4, further comprising:

a mount cavity defined proximate the second end of the second leg, and wherein the second end of the support partially passes through the mount cavity in the second end of the second leg.

6. The tree stand of claim 5, further comprising a plurality of spaced apart slots defined in the second end of the support.

7. The tree stand of claim 6, further comprising:

a tab extending outwardly from the second end of the second leg and for a distance into the mount cavity defined therein; and wherein the tab on the second leg removably engages in a selected one of the plurality of slots on the support to secure the support and the second leg together.

8. The tree stand of claim 7, wherein positioning the tab within one of the plurality of slots can control an angle between the seat and the tree to which the seat is attached.

9. The tree stand of claim 2, wherein the seat, the mount, and the support form a generally triangular shape.

10. The tree stand of claim 1, wherein the seat has a top surface opposed to the bottom surface.

11. The tree stand of claim 1 wherein the strap is adjustable in length and is also adapted to be used as a shoulder strap when the stand is disengaged from the tree.

12. The tree stand of claim 1 wherein the strap is removeable.

13. The tree stand of claim 1 wherein the seat is composed of plastic.

14. The tree stand of claim 1 wherein the seat, the mount, and the tree form a generally triangular shape.

15. The tree stand of claim 1, wherein a second end of the mount is adapted to engage a trunk of the tree, and wherein the second end of the mount further comprises a plurality of teeth adapted to bite into the trunk of the tree when the mount is moved to the use position.

16. The tree stand of claim 15, wherein the second end of the mount further comprises at least one support member that extends outwardly from the second end and adjacent the plurality of teeth.

17. The tree stand of claim 1, wherein the mount is generally a truncated V-shape being wider adjacent a front wall of the bottom surface and narrower remote therefrom.

18. The tree stand of claim 1, further comprising a handle disposed on the cover at a location remote from a front wall of the bottom surface, said handle extending outwardly from an exterior surface of the cover where the exterior surface is substantially aligned with the bottom surface of the seat when the tree stand is in the non-use position.

19. The tree stand as defined in claim 1, wherein the first member comprises:

a first leg that is pivotally secured to the bottom surface of the seat at a first end; and a second leg that is pivotally secured to a second end of the first leg and includes a second end that is adapted to abut the trunk of the tree; and a mount cavity defined in the second leg and through which the second end of the support is adjustably received.

* * * * *